US006993674B2

(12) United States Patent  
Kitajima et al.

(10) Patent No.: US 6,993,674 B2  
(45) Date of Patent: Jan. 31, 2006

(54) SYSTEM LSI ARCHITECTURE AND METHOD FOR CONTROLLING THE CLOCK OF A DATA PROCESSING SYSTEM THROUGH THE USE OF INSTRUCTIONS

(75) Inventors: Toshiaki Kitajima, Tokyo (JP); Takeshi Satou, Tokyo (JP)

(73) Assignee: Pacific Design, Inc., Tokyo (JP)

( * ) Notice: Subject to any disclaimer, the term of this patent is extended or adjusted under 35 U.S.C. 154(b) by 477 days.

(21) Appl. No.: 10/320,622

(22) Filed: Dec. 17, 2002

(65) Prior Publication Data

US 2003/0135778 A1 Jul. 17, 2003

(30) Foreign Application Priority Data

Dec. 27, 2001 (JP) .............................. 2001-396802  
Oct. 22, 2002 (JP) .............................. 2002-307555

(51) Int. Cl.  
*G06F 1/04* (2006.01)

(52) U.S. Cl. ...................................... 713/601; 713/600

(58) Field of Classification Search ................ 713/600, 713/601  
See application file for complete search history.

(56) References Cited

U.S. PATENT DOCUMENTS

| 4,395,758 A | | 7/1983 | Helenius et al. |
| 4,488,230 A | * | 12/1984 | Harrison ...................... 326/44 |
| 4,648,034 A | | 3/1987 | Heninger |
| 4,829,420 A | | 5/1989 | Stahle |
| 4,860,191 A | | 8/1989 | Nomura et al. |
| 4,953,082 A | * | 8/1990 | Nomura et al. ............... 712/25 |
| 5,430,850 A | | 7/1995 | Papadopoulos et al. |
| 5,450,553 A | | 9/1995 | Kitagaki et al. |
| 5,487,173 A | | 1/1996 | Greiss et al. |
| 5,495,588 A | | 2/1996 | Gibart et al. |
| 5,495,617 A | * | 2/1996 | Yamada ...................... 713/323 |
| 5,850,541 A | * | 12/1998 | Sugimoto ................... 713/601 |
| 5,870,602 A | | 2/1999 | Miller et al. |
| 5,894,582 A | | 4/1999 | Yoshida et al. |
| 5,903,744 A | | 5/1999 | Tseng et al. |
| 6,070,205 A | * | 5/2000 | Kato et al. ................. 710/100 |
| 6,301,650 B1 | | 10/2001 | Satou |
| 6,868,017 B2 | * | 3/2005 | Ikeda .................... 365/189.05 |
| 2002/0010848 A1 | | 1/2002 | Kamano |
| 2002/0029330 A1 | | 3/2002 | Kamano |
| 2002/0059510 A1 | | 5/2002 | Yoshimura |
| 2002/0103986 A1 | | 8/2002 | Shimogori |
| 2002/0152061 A1 | | 10/2002 | Shimogori |

(Continued)

FOREIGN PATENT DOCUMENTS

EP 0 174 231 A1 3/1986  
EP 0 588 341 A2 3/1994

(Continued)

*Primary Examiner*—Lynne H. Browne  
*Assistant Examiner*—Anand B. Patel  
(74) *Attorney, Agent, or Firm*—Buchanan Ingersoll PC

(57) ABSTRACT

A data processing system includes a general-purpose data processing unit (PU) including an instruction issuing unit that fetches and decodes an instruction in a program and issues the instruction and an execution unit that executes general-purpose processing according to a general-purpose instruction in the program; a special-purpose data processing unit (VU), including a data path unit for special-purpose data processing, that executes special-purpose data processing according to a special-purpose instruction in the program; and a first clock supply unit for stopping, based on a wait signal that is issued by the VU and shows that the PU is waiting for processing of the VU, a first clock signal for a part of the PU.

17 Claims, 8 Drawing Sheets

U.S. PATENT DOCUMENTS

| | | |
|---|---|---|
| 2002/0198606 A1 | 12/2002 | Satou |
| 2002/0199081 A1 | 12/2002 | Satou |
| 2003/0009652 A1 | 1/2003 | Satou |

FOREIGN PATENT DOCUMENTS

| | | |
|---|---|---|
| EP | 0 628 917 A2 | 6/1994 |
| EP | 0 671 685 A2 | 9/1995 |
| GB | 2 225 881 A | 6/1990 |
| GB | 2 230 119 A | 10/1990 |
| GB | 2 232 514 A | 12/1990 |
| JP | 2000-112585 | 4/2000 |
| JP | 2000-207202 | 7/2000 |
| WO | 95/19006 | 7/1995 |
| WO | 01/44964 A2 | 6/2001 |

* cited by examiner

SYSTEM LSI ARCHITECTURE AND METHOD FOR CONTROLLING THE CLOCK OF A DATA PROCESSING SYSTEM THROUGH THE USE OF INSTRUCTIONS

CROSS-REFERENCE TO RELATED APPLICATIONS

The present application claims priority of Japanese Patent Application No. 2001-396802, filed in Japan on Dec. 27, 2001, and to Japanese Patent Application No. 2002-307555, filed in Japan on Oct. 22, 2002, the entire contents of which are hereby incorporated herein by reference.

BACKGROUND OF THE INVENTION

1. Technical Field

The present invention relates to a data processing system that has a function for reducing power consumption.

2. Description of the Related Art

The ability of mobile appliances, such as mobile phones and mobile terminals, have been greatly expanded together with the advances in information, communication and network technologies. Mobile appliances are assumed to operate on batteries, so that there are stringent demands for the LSIs (Large Scale Integrated circuits) that are central to the constructions of such systems to operate with low power consumption. Japanese Laid-Open Patent Application No. 2000-112585 discloses a technique where power consumption is reduced in a system LSI, which includes one or a plurality of hardware modules and a CPU that controls the operation of such hardware modules in accordance with a program, by executing sleep instructions for halting the supply of a clock to the CPU.

Since offchip capacitance is much higher than onchip capacitance, integrating functions that are distributed among a plurality of chips into a single chip as a system LSI has many benefits with regard to reducing power consumption. Also, a further reduction can be made in power consumption by dividing the plurality of functions that have been incorporated in a system LSI into blocks and controlling the clock signals supplied to such blocks separately for each functional block including CPU. However, CPU is the processor core and if the processor core is halted unnecessarily, this can cause a large drop in the performance of the system LSI, though if the processor core is not halted, less of a reduction is made in the power consumption. If a hard ware control is applied for judging conditions of the processor core and for realizing a halt state of the processor core, more area is required in LSI for such hardware and it is thought that power consumption will increase. When control is performed by software alone, there is the problem that it is difficult to estimate the period for which the processor core can be halted.

In Japanese Laid-Open Patent Application No. 2000-112585, the above problem is solved by halting the supply of the clock to the CPU using a sleep instruction and recommencing the supply of the clock to the CPU on receiving an end of processing by the hardware module. However, it is necessary to arrange sleep instructions for stopping the supply of the clock to the CPU in the program, so that in order to stop the supply of the clock to the CPU with appropriate timing, program developers have to examine all of the operations of the CPU, which is to say, the operations of the LSI. Such operations include conditional branches and interrupt processing, so that an extremely large amount of time and cost are required in order to develop a program where the CPU is stopped with the appropriate timing and only the appropriate periods.

During the development of a system LSI also, there are always modification and/or changes in response to changes in specification and version upgrades. Accordingly, it is almost impossible to develop programs so that the CPU is appropriately stopped in accordance with such changes. When an LSI with a different specification is developed, developing a program where the CPU is appropriately stopped causes delays in the development of the LSI, which does not suit the current development environment for system LSIs which requires LSIs to be put on the market within a short time. Accordingly, it can be said that at present, there is no applicable technology for providing system LSIs that can reduce power consumption by stopping the clock of a CPU that is the processor core or LSI.

OBJECTS AND SUMMARY

For these reasons, it is an object of the present invention to provide a system LSI architecture and control method that can appropriately stop the clock of the processor core and make it possible to develop LSIs in a short time. In addition, it is a further object of the present invention to provide a function for controlling the clock of a processor core as a platform architecture which can be put to widespread use when developing LSIs for different applications and LSIs with different specifications.

A system LSI with special-purpose circuitry dedicated to a specific application or process can be developed by setting a general-purpose data processing unit (hereinafter sometimes referred to as a "PU") with basically same construction as a RISC processor as a platform and further including a special-purpose data processing unit (hereinafter sometimes referred to as a "VU") that has a data path unit for special-purpose data processing. By using the functions of an instruction issuing unit, which decodes instructions in a program and issues control signals to an execution unit of the PU, to control the VU according to control signals produced by decoding a special-purpose instruction in the same program, it is possible to supply a system LSI that achieves the dual merits of special-purpose circuitry and program control.

A construction (VUPU architecture) that includes the PU and the VU can reduce the development period of a system LSI that includes special-purpose or dedicated circuitry and is capable of high-speed processing, and can cope extremely flexibly with changes in the specification during development or in a post-development stage. At the same time, while parallel processing by the PU and the VU is possible, in many cases while data processing is being performed using the special-purpose circuitry in the VU, unless error processing or the like is requested, the PU enters a wait state until the processing of the VU ends or terminates. Since the VU is specialized, it is possible to judge whether the PU is waiting for the processing of the VU to end. Accordingly, by outputting a wait signal from the VU to show that the PU is waiting for the processing of the VU and performing control over the supply of a first clock signal to the PU according to this wait signal, it is possible to appropriately halt the PU, which is the processor core of a data processing system like system LSI, for the appropriate period. Therefore, the power consumption of the PU is reduced without lowering the performance of the data processing apparatus which is a system LSI.

In addition in the PU, a clock signal is continuously supplied to a interrupt/reset function unit that detects interrupt signals and reset signals, so that this unit is not halted. This means that even if the PU is in the halted state, when it becomes necessary to clear the halted state due to conditions such as the processing in the VU having ended, it is always possible to restore the PU.

According to an embodiment of this invention, while it is possible during the program development stage to stop the clock of the PU using instructions, by merely writing a VU instruction, the clock of the PU can be suitably controlled in accordance with the functions of that VU instruction. This means that there is a large decrease in the time and cost required by program development for a program that includes a clock stopping function for the processor core. In addition, when it is necessary to amend the program due to changes in the specification or the like, the clock stopping function that relates to VU instructions does not affect such changes, so that clock control does not cause problems when changing or updating the program.

In this architecture (VUPU) that provides a system LSI including a PU and a VU or VUs, the function for controlling the clock of the PU is provided by the VU, and so does not depend on the PU. Accordingly, an embodiment of the present invention can be applied to every system LSI that has a PU as a platform. Once the functions of a VU that includes user logic have been developed, this VU can be fully utilized as a resource when developing a new system LSI, with a function for controlling the clock of the PU being added to the functions of the VU. Accordingly, when a new system LSI that includes an existing VU is developed, control over the clock of the PU is automatically incorporated. This means that a system LSI that can appropriately stop the clock of the processor core can be developed in a short time and provided.

This is to say, a data processing apparatus or system of an embodiment of the present invention includes: a general-purpose data processing unit (PU) including (1) an instruction issuing unit that fetches and decodes an instruction in a program and issues the instruction or control signals, and (2) an execution unit that executes general-purpose processing according to a general-purpose instruction in the program or control signals produced by decoding the general-purpose instruction; a special-purpose data processing unit (VU), including a data path unit for special-purpose data processing, that executes special-purpose data processing according to a special-purpose instruction in the program or control signals produced by decoding the special-purpose instruction; and a first clock supply unit for stopping, based on a wait signal that is issued by the VU and shows that the PU is waiting for processing of the VU, a first clock signal for a part of the PU excluding an interrupt/reset function unit that detects an interrupt signal and a reset signal.

In addition, a control method for a data processing system is provided by an embodiment of the invention. The control method includes: a step of fetching and decoding an instruction in a program and supplying, when the instruction in the program is a general-purpose instruction (PU instruction), the PU instruction or control signals produced by decoding the PU instruction to an execution unit of a general-purpose data processing unit (PU); a step of supplying, when the instruction in the program is a special-purpose instruction (VU instruction), the VU instruction or control signals produced by decoding the VU instruction to a special-purpose data processing unit (VU) including a data path unit for special-purpose data processing; and a step of stopping, based on a wait signal that is issued by the VU and shows that the PU is waiting for processing of the VU, a first clock signal for a part of the general-purpose data processing unit excluding an interrupt/reset function unit that detects an interrupt signal and a reset signal. In this specification, PU instruction and VU instruction sometime means instructions and the control signals thereof.

To make it possible for a program to control the clock signal, it is preferable for the PU to include a first clock managing function unit which, according to a PU instruction, allows the first clock supply unit to stop the first clock signal, By supplying the wait signal from the VU to this first clock managing function unit, it is possible for the PU to perform centralized control over the first clock supply unit, which makes it easy to use the first clock supply unit alongside the PU as a platform.

It is also preferable for the wait signal supplied from the VU to the first clock managing function unit of the PU to include a first wait signal that allows the first clock signal to be stopped and a second wait signal that does not allow the first clock signal to be stopped. The VU is able to estimate the number of clock cycles that are consumed by the processing in the VU, and if the processing in the VU only consumes a few clock cycles, stopping the clock of the PU only causes a decrease in the PU processing speed and so is not preferable. Accordingly, it is preferable in this case to output the second wait signal and so not stop the first clock signal.

In a system LSI with the VUPU architecture, VU instructions are executed by the VU, so that there is no need for the PU to grasp the content of the VU instructions, which means that the PU has a construction that is suited to a platform with widespread applicability. Even if the PU cannot grasp the content of the VU instructions, the PU can judge the timing at which a VU instruction is supplied to the VU. This means that it is possible to provide a second clock supply unit for supplying a second clock signal for operating the VU, and to provide the PU with a second clock managing function unit which allows the second clock supply means to supply the second clock signal when a VU instruction for the VU has been supplied, thereby additionally providing a function for reducing the power consumption of a VU as part of the platform. This second clock managing function can allow the second clock supply unit to stop the second clock signal based on a wait signal outputted from the VU. Accordingly, when a VU instruction is supplied to the VU, the second clock signal for operating the VU is supplied, with it being possible to stop the second clock signal based on the wait signal outputted from the VU.

In a system LSI with the VUPU architecture, while the PU is in a state where the PU is waiting for processing of the VU to end, the PU does not fetch any instructions and does not generate any accesses to the data RAM. This means that it is possible to stop the supply of a clock signal to the memory unit and to reduce the power consumption without lowering the performance of the system LSI. It is therefore preferable for a VUPU that includes a memory unit that stores a program and/or data that is processed by the PU to further include a third clock supply unit for supplying, according to a memory selection signal that shows that the PU is accessing the memory unit, a third clock signal that has the memory unit operate.

A state occurs where it is estimated in the VU that only a few clock cycles are consumed by the processing, and the supply of the first clock signal to the PU is not stopped even though the PU is in a wait state. During this period, even though the PU is operational, a memory selection signal is not outputted, so that it is preferable to stop the supply of the third clock signal to the memory unit and so reduce the power consumption of the memory unit. During this few clock cycles or longer, the effect of the reduced power consumption exceeds the drop in the access speed for the memory unit. In addition with the VUPU architecture, there are many cases where the main processing role of the PU is to control the VU with the majority of the processing being performed in the VU, so that decreases in the access speed for the memory unit do not adversely affect the performance of the system LSI.

In the memory clock supplying process that supplies the third clock signal for operating the memory unit according to the memory selection signal, in cases where the memory unit includes a plurality of memory blocks, it is preferable for the third clock supply unit to supply the clock signal to the memory block selected by the address outputted from the PU. By supplying the clock signal to only the selected memory block, it is not necessary to operate the entire memory unit, so that a further reduction can be made in the power consumption.

A process that downloads a program from an external memory into the memory unit that stores the program may occur at first in an operation of a system LSI. A download control unit that controls this process is required as part of the system LSI but does not need to operate all of the time. Accordingly, it is preferable to provide a fourth clock supply unit for supplying, according to a download start signal from outside, a fourth clock signal that has the download control unit operate, with the fourth clock supply unit supplying the download control unit with the fourth clock signal for operation according to a download start signal from outside. When the PU includes a download function unit that only operates when the download control unit is operational, it is preferable for the fourth control signal to be supplied to this download function unit.

While a debug unit that can monitor the data being processed by the PU and/or VU is required as part of a system LSI, this debug unit does not need to operate all of the time. Accordingly it is preferable to provide a fifth clock supply unit for supplying, according to a debug signal from outside, a fifth clock signal that has the debug unit operate. By the fifth clock supply unit, the debug unit is in operation according to a debug start signal from outside. When the PU includes a debug function unit that only operates when the debug unit is operational, it is preferable for the fifth control signal to be supplied to this debug function unit.

A processor or system with a VUPU architecture including a general-purpose data processing unit (PU) and a special-purpose data processing unit (VU) is a processor that can be implemented with special-purpose instructions (VU instructions) that are dedicated to specific processes or applications, and can be used to construct a processor that is suited to mobile appliance applications. By separately controlling the clock signals supplied to the PU, the VU, and the memory unit, etc., the work rate or performance under low power can be increased, so that a high-performance processor with low power consumption can be provided.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 1:
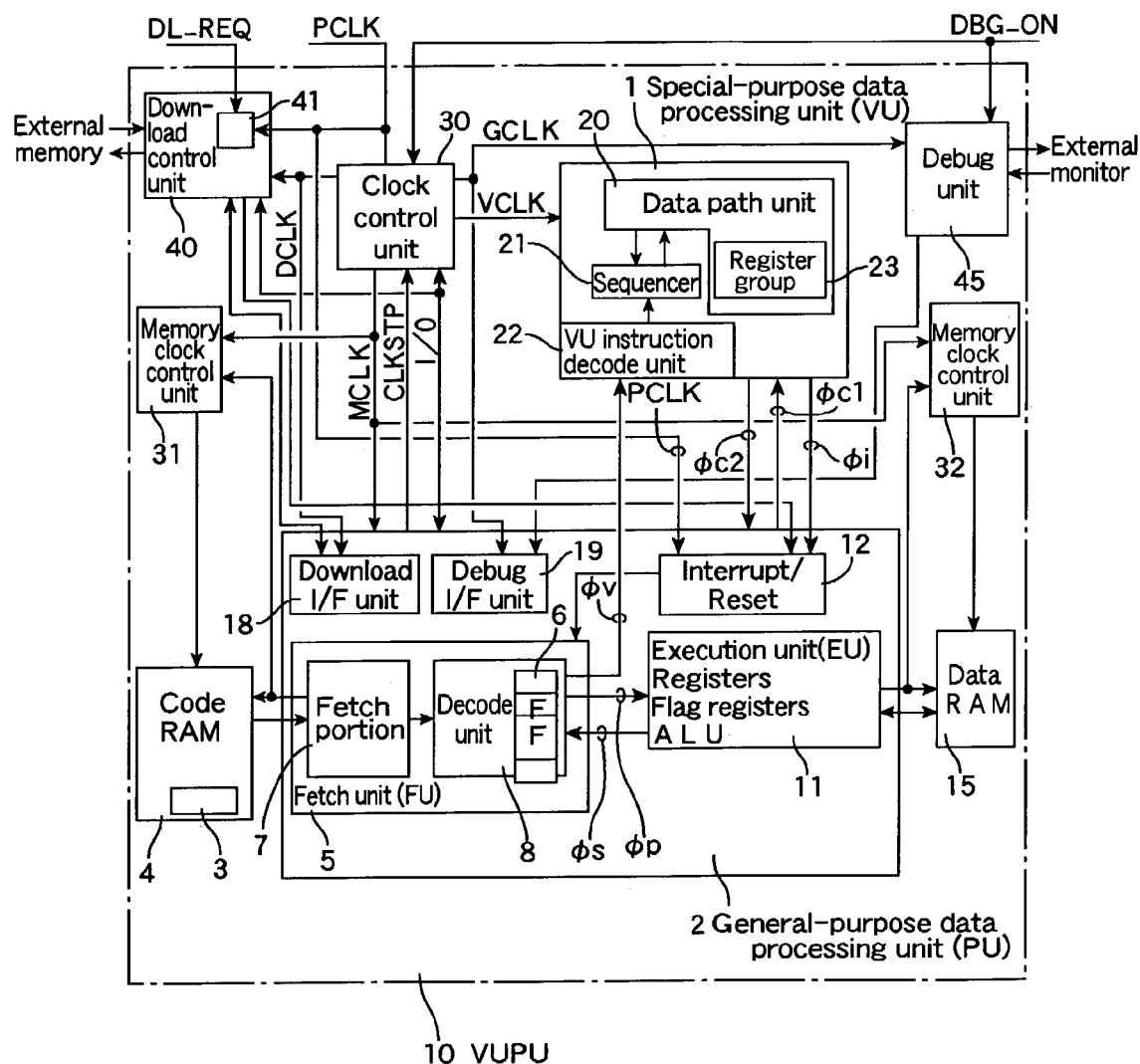
FIG. 1 shows an overview of a data processing apparatus (VUPU) according to an embodiment of the present invention that includes a PU and a VU.

The following describes an embodiment of the present invention with reference to the attached drawings. A data processing system 10 of the present embodiment shown in FIG. 1 includes a special-purpose data processing unit (a special-purpose instruction executing unit, hereinafter "VU") 1 that is dedicated to special or specific processing, and a general-purpose data processing unit (a general purpose instruction executing unit or processing unit, hereinafter "PU") 2 whose construction resembles a standard processor though its detailed functions are different. Accordingly, the data processing apparatus or system 10 is a programmable processor that includes at least a special-purpose circuit.

The PU 2 includes a fetch unit (hereinafter "FU") 5 and an executing unit (hereinafter "EU") 11 that is composed of general-purpose registers, flag registers, computational units (ALU), etc., and has widespread applicability. The FU 5 fetches an instruction from a code RAM 4, which stores executable control or object program (program code or microprogram code) 3, and supplies the fetched instruction or control signals produced by decoding instruction to the EU 11 and the VU 1. The EU 11 executes general-purpose processing while inputting and outputting data to and from a data RAM 15 that is used as a temporary storage region. In addition, the PU 2 has an interrupt/reset detecting circuit 12 for detecting interrupt signals _i and reset signals.

The FU 5 is an instruction issuing unit and includes a fetch unit 7 that fetches an instruction from an address in the code RAM 4 that is determined by a previous instruction, the state of a state register 6, an interrupt signal _i, etc., and a decoding unit 8 that decodes the fetched special-purpose instruction (VU instruction) or general-purpose instruction (standard instruction, PU instruction). The decoding unit 8 supplies a control signal (Decoded Control Signal) _v produced by decoding a VU instruction and control signal (Decoded Control Signal) _p produced by decoding a PU instruction to the VU 1 and an execution unit 11 of the PU 2, respectively. In addition, a status signal (Exec Unit Status Signal) _s showing the execution state is sent back by the execution unit 11 and the states of the execution unit 11 and the VU 1 are reflected in the state register 6.

Accordingly, for the FU 5, the execution unit 11 of the PU 2 and the VU 1 are processing units on the same level, and the VUPU architecture of the present embodiment can be thought of as being an architecture where the FU 5 is set as a common instruction issuing unit for both the execution unit 11 and the VU 1, and the execution unit 11 is arranged in parallel with the VU 1 as a general-purpose processing unit. Also, to simplify the description in this specification, a control signal _p that has been decoded from a general-purpose instruction (PU instruction) and is supplied from the FU 5 to the execution unit 11 is also referred to as a "PU instruction" and a control signal _v that has been decoded from a special-purpose instruction (VU instruction) and is supplied from the FU 5 to the VU 1 is also referred to as a "VU instruction".

The special-purpose data processing unit (VU) 1 that executes the VU instruction _v from the FU 5 includes a unit 22 that selects a VU instruction _v that is directed to this unit and decodes the VU instruction _v, a sequencer (FSM (Finite State Machine)) 21 that outputs, using hardware, control signals that have predetermined data processing executed, and a data path unit 20 is a special-purpose circuit (dedicated or specific-processing circuit) that has been designed so as to perform the predetermined data processing in accordance with the control signals from the sequencer 21. The VU 1 includes a register 23 that can be accessed from the PU 2, and the PU 2 can control, via this interface register 23, data that is required by the processing by the data path unit 20. The PU 2 can also refer to the internal state of the VU 1 via the register 23. The result of the processing by the data path unit 20 can also be supplied to the PU 2 with the PU 2 then executing processing that uses this result.

It is also possible for various states to be exchanged between the VU 1 and the PU 2 using command levels and interrupt signals. VUCMD _c1 is a kind of instruction command that is issued to the VU 1 from the EU 11 which is the execution stage of the PU 2, and describes the content of a processing request to the VU 1. As one example, when the content of the VUCMD _c1 is "WAITV", this is a command that enquires whether the PU 2 should enter an interrupt wait state while a VU instruction _v that is a special-purpose instruction is being executed, which is to say, whether the PU 2 should be a halt state (HALT) until an interrupt signal _i is supplied. In response to this, a command or signal _c2 is sent back from the VU 1 to the PU 2. As one example, when the VU 1 asserts a VUWAIT signal _c2, this response requests the PU 2 to enter the wait state until the execution of the VU 1 has ended. Accordingly, the PU2 enters the halt state until the interrupt signal _i is detected.

A program 3 that includes general-purpose instructions (PU instructions) and special-purpose instructions (VU instructions) is stored in the code RAM 4, with this program 3 being fetched by the fetch unit 5 and being supplied to the VU 1 and the PU 2 respectively. In this VUPU 10, both fetched PU instructions and fetched VU instructions (or control signals produced by decoding such instructions) are supplied to the VU 1, and when a VU instruction that activates the VU 1 is supplied, the VU instruction decoder 22 selects this VU instruction and operates. On the other hand, the EU 11 in the PU 2 is supplied with only PU instructions or control signals _p produced by decoding such PU instructions, so that VU instructions are not issued to the EU 11 and in their place, control signals indicating a nop instruction that does not necessitate execution are issued. The EU 11 does not need to interpret VU instructions that are instructions that can be customized by users, so that it is possible to provide a VUPU 10 that can execute a program 3 including new VU instructions or a variety of VU instructions without having to change the construction of the PU 2. However, even if the execution unit 11 does not need to interpret VU instructions, the execution unit 11 can still know the timing at which VU instructions _v are supplied to the VU 1, so that in the VUPU 10 of the present embodiment, a clock signal for the VU (the second clock signal, VCLK) can be controlled at the timing when a VU instruction _v is supplied to the VU 1.

A VUPU 10 with this kind of construction has a large merit. This is to say, the VU 1 can be changed according to the application, etc., and in many cases the VU instructions that give indications to the VU 1 are changed depending on the application. The VU 1 is a special-purpose circuit that is dedicated to an application, so that it is easy to design a circuit that can interpret control signals produced by decoding dedicated VU instructions. On the other hand, by outputting nop instructions to the PU 2, there is no need for the PU 2 to handle instructions that are dedicated to the VU 1, with the PU 2 only needing a function for interpreting and executing PU instructions that are basic instructions or general-purpose instructions. Accordingly, with this architecture (referred to as the "VUPU architecture" in this specification), a PU 2 can be provided alongside VUs 1 that are suited to various applications without sacrificing the general-purpose applicability of the PU 2. This means that the PU 2 can be used as a platform that is capable of processing that controls the VU 1 and uses the computation results of the VU 1.

Accordingly, the data processing apparatus 10 shown in FIG. 1 is a system LSI that includes a VU 1 equipped with a dedicated circuit that can realize processing where special or specific computation is required, such as processing that requires real-time response, and a PU 2 with general-purpose applicability, with the present specification referring to this system LSI as a VUPU 10. The VUPU 10 can reduce the time required for design and development without sacrificing real-time response, and can flexibly handle changes, modifications and revisions made at a later date. The VUPU 10 is not limited to having one VU 1, and a plurality of VUs 1 may be provided to perform special-purpose processing that is demanded by an application, with it being possible to include a plurality of special-purpose instructions for activating the respective VUs 1 in the program code.

In addition to the VU1, the PU 2, and the code RAM 4 and data RAM 15 that are memory units, the VUPU 10 includes a download control unit 40 that controls downloads from an external memory into the code RAM 4 and a debug unit 45 that can monitor data during processing by the PU 2 and/or the VU 1. Correspondingly, the PU 2 includes a download interface 18 that is only active when the download control unit 40 is in operation and provides an interface with the download control unit 40, and a debug interface 19 that is only active when the debug unit 45 is in operation and provides an interface with the debug unit 45.

The VUPU 10 further includes clock control units 30, 31, and 32 for controlling the starting and halting of clock signals that are supplied to these units. The clock control unit 30 controls the clock signal supplied to the VU 1, the PU 2, the download control unit 40, and the debug unit 45. To do so, the clock control unit 30 includes an MCLK supply circuit that controls a first clock signal (MCLK) that is supplied to the PU 2, a VCLK supply circuit that controls a second clock signal (VCLK) that is supplied to the VU 1, a DCLK supply circuit that controls a fourth clock signal (DCLK) that is supplied to the download control unit 40, and a GCLK supply circuit that controls a fifth clock signal (GCLK) that is supplied to the debug unit 45. The clock control units 31 and 32 control a third clock signal that is supplied to the RAMs 4 and 5.

Figure 2:
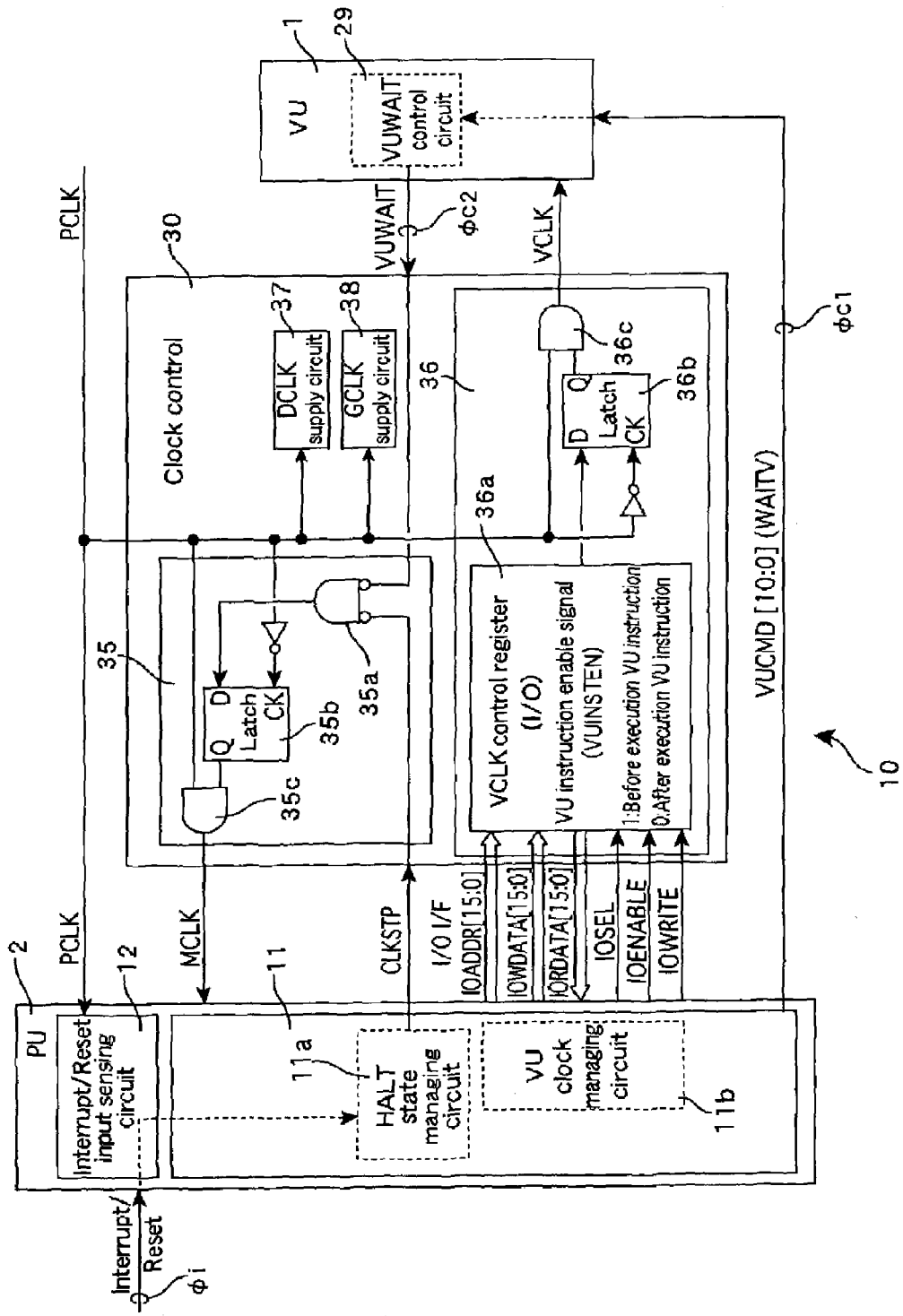
FIG. 2 is a block diagram showing supply circuits for an MCLK signal and a VCLK signal.

FIG. 2 shows the control system for the clock signals MCLK and VCLK in the VUPU 10 of the present embodiment. The clock signal PCLK is a master clock signal that is supplied to the VUPU 10, and is a clock signal that always operates. In the VUPU 10, the PCLK is supplied to only the interrupt/reset detecting circuit 12 of the PU 2 and a download state management circuit 41 in the download control unit 40. To the other functional units, clock signals that can control the on/off states of each function are supplied by the clock control unit 30. The clock signal MCLK is the first clock signal that is generated from the clock signal and supplied to every part of PU 2 except for the interrupt/reset detecting circuit 12. Accordingly, in the PU, by setting the clock signal MCLK at off, only the clock signal PCLK that is supplied to the interrupt/reset detecting circuit 12 is active, thereby generating a low power consumption state where only the interrupt/reset detecting circuit 12 operates.

The clock signal VCLK is the second clock signal that is supplied to the VU 1. The clock control unit 30 is notified by an IO instruction (an input/output instruction, I/O-I/F signal) from the PU 2 immediately before a VU instruction _v is issued, the clock signal VCLK is generated from the clock signal PCLK and supplied to the VU 1 for activating the VU 1. When the execution of the VU instruction _v ends, the clock control unit 30 is notified by the PU 2 of the end of processing by the VU 1 via an I/O-I/F instruction and accordingly stops the clock signal VCLK.

One example of an MCLK supply circuit 35 that generates the clock signal MCLK is shown in FIG. 2. This MCLK supply circuit 35 is supplied with the PCLK signal, a CLKSTP signal from the PU 2 that permits the halting of the outputted clock, and a VUWAIT signal from the VU 1 that also permits the halting of the outputted clock. The MCLK supply circuit 35 has a gate circuit 35a that computes a NAND for the CLKSTP signal and the VUWAIT signal, a latch circuit 35b that latches the output of the gate circuit 35a, and a gate circuit 35c that generates the MCLK signal from the PCLK signal and supplies the MCLK signal to the PU 2 when the CLKSTP signal and the VUWAIT signal are not both at a high level. The latch circuit 35b may be a flip-flop, though it is preferable to use a latch circuit that has a small gate size and a margin being able to set as the setup time of the D input. The clock input is set as the inverse of the PCLK signal, so that the delay cycle (overhead) of the halting and restarting of the MCLK signal is eliminated, and the generation of clock noise ("spikes") when both clocks are stopped and the omission of rising edges when the supplying recommences are prevented. This is also the case with the other clock supply circuits shown below.

Accordingly, when any one of the CLKSTP signal and the VUWAIT signal is at a high level, the MCLK signal is not outputted from the MCLK supply circuit 35, and the PU 2 that is the processor core of VUPU 10 enters a halted state where the PCLK signal is supplied only to the interrupt/reset detecting circuit 12 that senses interrupts and reset signals only, thereby reducing the power consumed by the PU 2.

The CLKSTP signal is a signal that enables a stopping of the clock signal and is set at on by a HALT instruction for the PU 2. The execution unit 11 (PU 2) includes a HALT state managing circuit (a first clock managing function unit) 11a that interprets a HALT instruction that has been fetched from the program 3 and supplied by the FU 5 and outputs the CLKSTP signal when the HALT instruction has been identified. Accordingly, when a programmer identifies that the PU is not operating and is waiting for an interrupt, the programmer can insert a HALT instruction into the program so as to turn on the CLKSTP signal and set the PU 2 in the HALT state, thereby suppressing the power consumption of the PU 2 while the PU is not operating.

It should be noted that the HALT state of the PU 2 is released by an interrupt/reset signal _i, with the interrupt/reset detecting circuit 12 always being active due to the PCLK signal. When the CLKSTP signal is turned on by software in the form of a HALT instruction, the MCLK signal is stopped and most parts of the PU 2 are halted. Later, by issuing an interrupt/reset signal _i, the CLKSTP signal is turned off via a HALT state managing circuit 11a and the MCLK signal is activated by the MCLK supply circuit 35, so that the PU 2 can be set in the normal operation mode.

The VUWAIT signal is a signal that shows that the VU 1 is under the execution state. When the PU 2 waits for the processing result of the VU 1 after a VU instruction _v has been issued, a VUWAIT control circuit 29 in the VU 1 responds to a command WAITV showing that the PU 2 is waiting for the operation of the VU 1 to end by continuously outputting the VUWAIT signal while the VU 1 is in the execution state. This means that when the PU 2 is waiting for the operation or execution of the VU 1 and the VU 1 is still operating, the PU 2 can judge this from the on state of the VUWAIT signal. When the VUWAIT signal is on, the MCLK supply circuit 35 stops the MCLK signal and so reduces the power consumption in the PU 2. On the other hand, when the processing of the VU 1 is terminated, the VUWAIT signal is cleared, so that the MCLK signal is supplied from the MCLK supply circuit 35 to the PU 2, thereby activating the PU 2.

Accordingly, with the VUPU 10, when the programmer judges that the PU 2 can be set in the HALT state, the power consumption of the PU 2 can be reduced using software. Also, when the PU 2 waits for the processing result of the VU 1 after a VU instruction _v has been issued, the operation of the PU 2 is automatically halted, thereby reducing power consumption. Since the VU 1 is a special-purpose circuit, it is possible to judge whether the PU 2 is waiting for the processing of the VU 1 to end. By using the wait signal (VUWAIT) that is outputted from the VU 1 and shows that the PU 2 is waiting for the processing of the VU 1, the supplying of the MCLK to the PU 2 can be controlled, which makes it possible to appropriately halt the PU 2 with the appropriate timing. In addition, control according to the VUWAIT signal that sets the PU 2 in the WAIT state does not need to be actively made by the program.

With the VUPU 10, at the development stage for the program, it is possible to stop the clock of the PU 2 using instructions, but simply by writing a VU instruction, the clock of the PU 2 can be appropriately controlled at timing that is suited to the functions of the VU instruction. This means that large reductions can be made in the time and cost required by program development of a program including a function for stopping the clock for the PU 2. In addition, when the program needs to be amended due to a change in the specification or the like, if there are no changes to the functions of the VU 1, which is to say, no changes in the processing content indicated by the VU instructions, there is no effect on the related VUWAIT control function. Accordingly, not just at the program development stage but also at later stages where a program is changed or updated, the program may not be changed or regenerated for solving clock control problem. By activating the VU 1 with a VU instruction, the clock of the PU 2 can be appropriately controlled by the VUWAIT control function, so that the power consumption of the PU 2 can be reduced without reducing the performance of the VUPU 10.

In addition, the ability to control the power consumption of the PU 2 according to signals from the VU 1 means that a variety of applications can control the clock of the PU 2 instantly and extremely easily without affecting the general-purpose applicability of the PU 2, so that the present invention can be applied to every system LSI that has the PU 2 as a platform, which is to say, to every VUPU 10. Once the functions of a VU 1 that includes the user logic have been developed, these can be utilized as resources in the development of another VUPU 10, so that a function for controlling the clock of the PU 2 can be added to the resources of the VU 1. Accordingly, when developing a new system LSI that includes an existing VU 1, control of the clock of the PU 2 is automatically incorporated. This means that the development of a system LSI including clock control for the processor core can be completed in a short time.

When the supply of the MCLK signal to the PU 2 is halted, overheads of several clock cycles are generated to halt and recommence the clock. However, when the period during which the special processing function assigned to the VU 1 operates is relatively long, the delay caused by the processing that turns the clock signal on and off is hardly a problem. As examples, when searching for a special code from a bitstream during image processing or another searching for an address during network processing is assigned as the special-purpose processing of the VU 1, the period where only the VU 1 performs such searching is relatively long, so that even if several clock cycles are consumed by a processing for switching the clock signal on and off, this has very little effect on the performance of the VUPU 10. Power consumption can therefore be reduced without lowering the performance.

On the other hand, when the number of execution cycles of the processing executed by the VU 1 according to a VU instruction is small, the overheads due to the several clock cycles taken to halt and restart the clock become problematic, so that there is the possibility that such cycles will become actually additional execution cycles of the VUPU 10 and will also have little effect in reducing the power consumption. With the present invention where the clock of the PU 2 is controlled according to a wait signal from the VU 1, this kind of problem can be solved easily. This is to say, the VU 1 that performs the actual processing is capable of estimating how clock cycles will be taken by the processing by the VU itself, and so can output different wait signals depending on the number of clock cycles.

Figure 3:
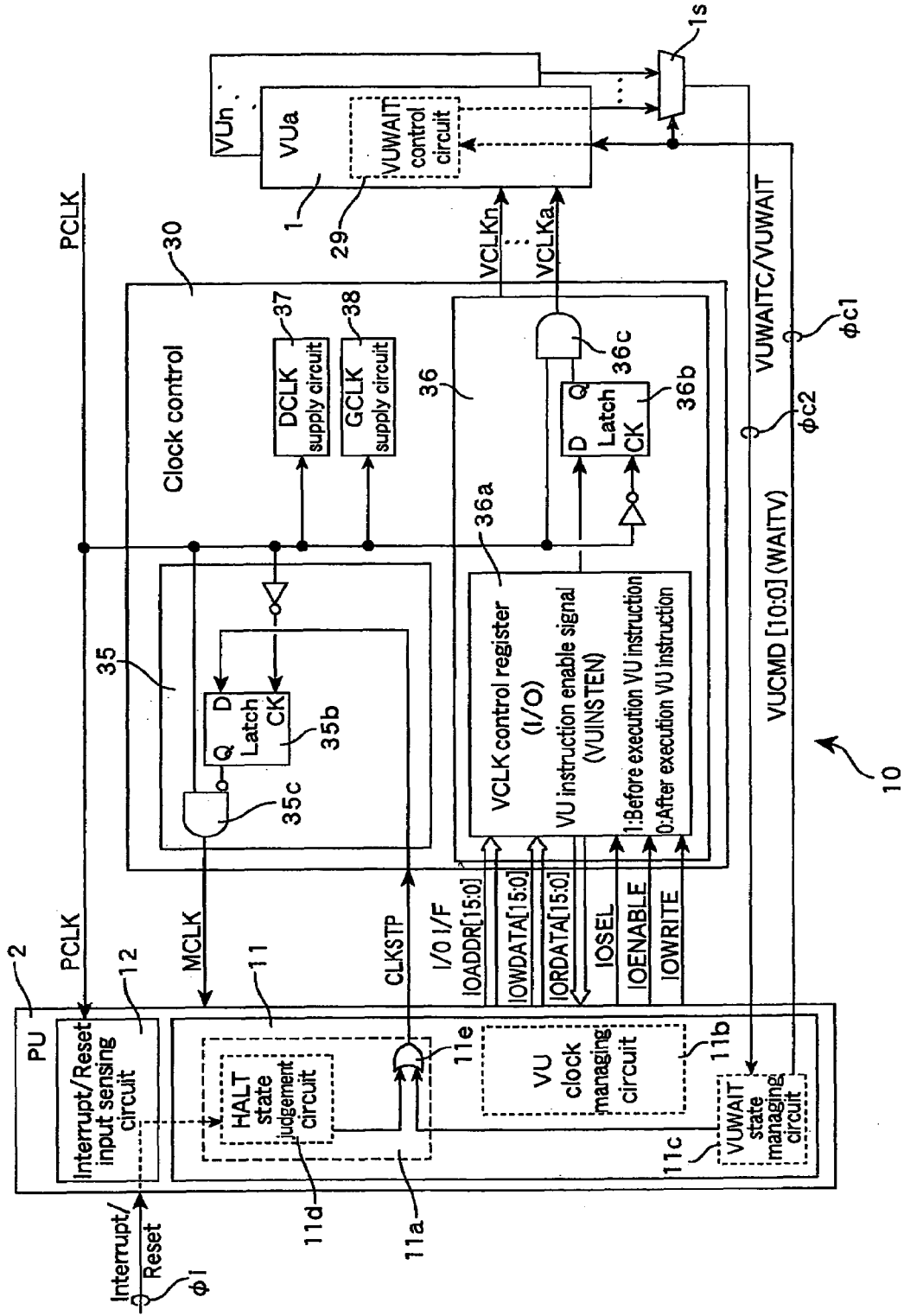
FIG. 3 is a block diagram showing alternative supply circuits for the MCLK signal and the VCLK signal.

FIG. 3 shows a different example of the clock control unit 30 that includes the MCLK supply circuit 35. In this example, two types of signals are provided as the input signals _c2 inputted into the PU 2 from the VU 1. One of these two types of signals is the VUWAIT signal that shows that the PU 2 is in a wait state but does not permit the stopping of the MCLK signal. Therefore, in this case, the VUWAIT signal is the second wait signal and this signal shows that there is the possibility of the operation of the PU 2 recommencing within several clock cycles. On the other hand, the VUWAITC signal permits the stopping of the PU 2, and so permits the halting of the MCLK signal. Therefore, the VUWAITC signal is the first wait signal and this signal shows the processing time of the VU 1 is relatively long, so that the effect achieved by halting the clock and reducing the power consumption is greater than the overheads that are caused by the halting and restarting of the clock.

For this reason, the EU 11 of the PU 2 includes a VUWAIT state managing circuit unit 11c that distinguishes between these two VUWAIT signals. In addition, in order to perform a judgement of the VUWAIT signal in the EU 11, the HALT state managing circuit 11a is equipped with a function for judging the HALT state and additionally with a gate 11e for calculating a logical OR for a stopping request for the MCLK signal made via a wait signal that is VUWAITC signal in this case. With this construction, the MCLK supply circuit 35 of the clock control unit 30 can be controlled by just the CLKSTP signal that is supplied from the PU 2, so it is not necessary to supply a wait signal from the VU 1. Accordingly, the clock control unit 30 of this embodiment has a greater widespread applicability. In this example, the supply of the MCLK signal recommenced by clearing the VUWAITC signal.

In the VUPU 10 shown in FIG. 3, a VUWAIT signal is outputted from the VU 1 and when this signal is asserted, the execution of the PU 2 is stopped, though since an MCLK halt request is not outputted, the CLKSTP signal is not changed, and the MCLK continues to operate. On the other hand, when the VUWAITC signal is asserted, the execution of the PU 2 is stopped and at the same time an MCLK halt request is outputted, so that the CLKSTP output signal from the PU 2 is asserted and the MCLK is halted by the clock control unit 30.

The VCLK supply circuit 36 shown in FIGS. 2 and 3 stops the supply of the VCLK signal when the VU 1 is not operating. In the VUPU 10 of the present embodiment, the operation of the VU 1 also can be stopped by software. When the programmer judges that the operation of the VU 1 can be stopped, programmer can write an instruction that stops the VU 1 as a PU instruction _p. When the PU 2 has that PU instruction _p or when the PU 2 judges that the VUWAIT signal (including VUWAITC signal in the latter case) is off (cleared), the VU clock managing circuit (the second clock managing function unit) 11b of the EU 11 in the PU 2 generates a VUINSTEN signal indicating stop the VCLK signal. When a VU instruction is supplied, the VU clock managing circuit 11b generates a VUINSTEN signal indicating start the supply of the VCLK signal.

Using the data buses IOWDATA and IORDATA, the address bus IOADDR, and the input/output control signals IOSEL, IOENABLE, and IOWRITE, the VUINSTEN signal is written in a VCLK control register 36a provided in the VCLK supply circuit 36 as input/output signals (I/O signals). According to the VUINSTEN signal, the VCLK control register 36a is set at "1" before the execution of a VU instruction and cleared to or set at "0" after the execution of the VU instruction. The value of the register 36a is latched by a latch circuit 36b, and a logical AND is calculated for the output of the latch circuit 36b and the PCLK signal by a gate circuit 36c, so that when a VU instruction is executed, the VCLK signal is supplied to the VU 1 from the gate circuit 36c. In this case, by combining an input/output instruction (I/O instruction) with a clock signal (PCLK signal) that is always operational, it is possible to provide the clock signal VCLK to the VU 1 only when the VU 1 is activated by a VU instruction.

The VU clock managing circuit 11b in the EU 11 only needs to judge whether a VU instruction is being supplied and does not need to interpret the content of a VU instruction. Accordingly, the VU clock can be managed without sacrificing the general-purpose applicability of the PU 2, and the PU 2 can control the clock of the VU 1 without losing its function as a platform.

In the VUPU 10, the functions of the MCLK supply circuit 35 and the VCLK supply circuit 36 of the clock control unit 30 can halt the supply of the clock signal MCLK to the PU 2 and so halt the PU 2 while a VU instruction _v is being executed and can halt the supply of the clock signal VCLK to the VU 1 and so halt the VU 1 while a VU instruction _v is not being executed, thereby reducing the power consumption well. The MCLK signal is stopped by the wait signal of the VU 1 and also stopping the VCLK signal can be cleared by this wait signal, it is possible to provide the VU 1 with a function that effectively controls the turning on and off of clock signals. This means that the clock can be controlled without increasing the programming load of the PU 2 for reducing power consumption.

In a VUPU 10 that is provided with a plurality of VUs (VUa to VUn), a VUWAIT signal or VUWAITC signal is outputted from the VUWAIT control circuit 29 of each VU. Information showing to which VU instruction a WAITV instruction relates is included in the VUCMD _c1, so that by using this information, one of the signals VUWAITn and VUWAITCn can be selected by the selector 1s and outputted to the PU 2. Accordingly, it is possible to specify the VU 1 for which the supplying of the VCLK signal is to be stopped, and the clock (VCLKn) for this VU 1 can be appropriately stopped and restarted.

When the VCLK signal to the VU 1 is commenced, overheads of several clock cycles may be generated. However, when the period during which the special processing function assigned to the VU 1 operates is relatively long, the delay caused by the processing that turns the clock signal on and off is hardly a problem as the same as MCLK signal. In addition, while there is a slight increase in the scale of the circuit for the FU 5, depending on the method for prefetching, the VU 1 can be activated well before a VU instruction _v is actually executed, so that it is also possible to eliminate the delays due to the switching on and off of the clock signal.

Figure 4:
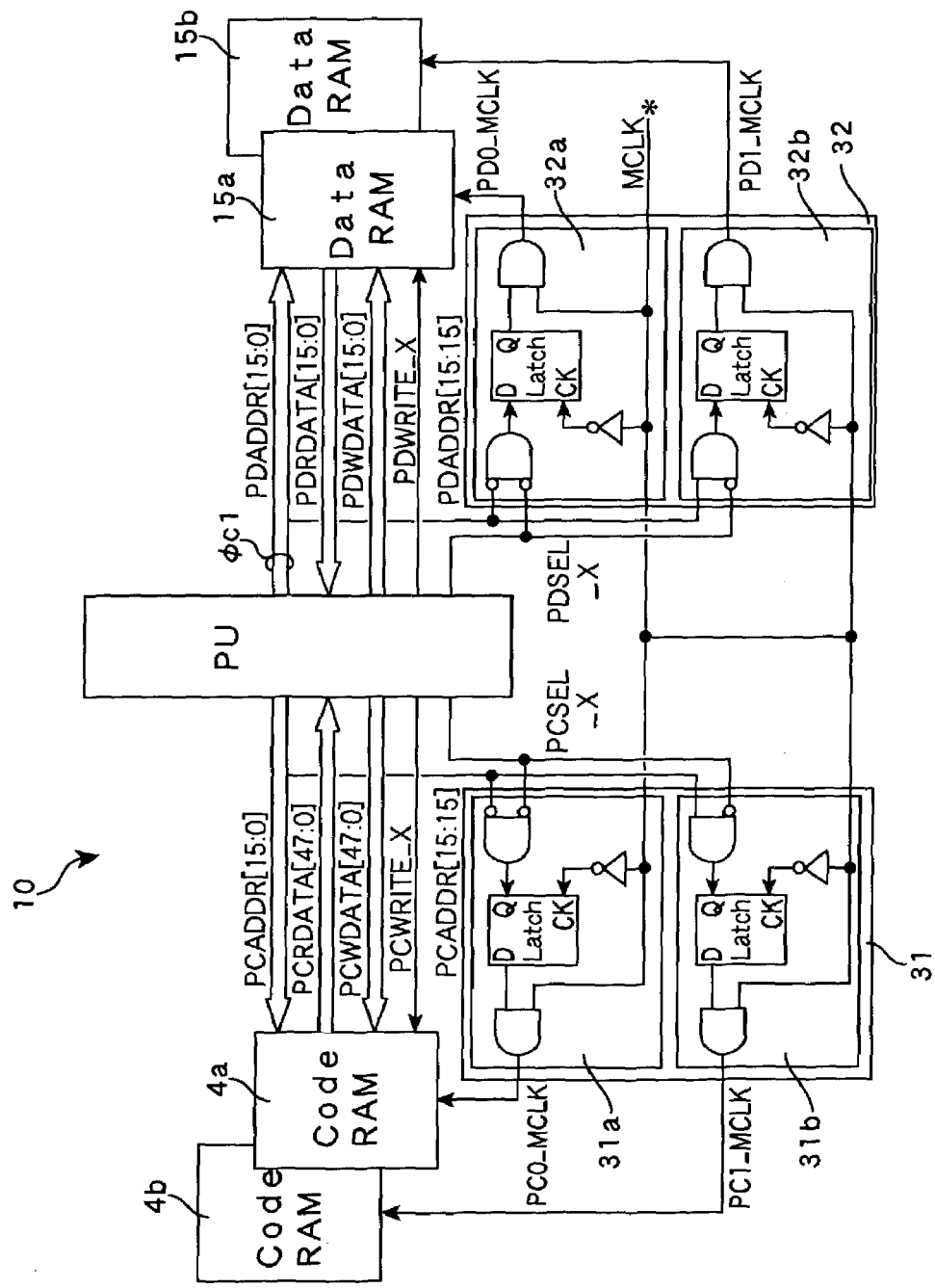
FIG. 4 is a block diagram showing a clock supply circuit for a memory unit.

FIG. 4 shows the overall construction of memory clock control units 31 and 32. These control units 31 and 32 supply clock signals that perform on/off control of the clock signal MCLK for the code RAM 4 and the data RAM 15. The clock control unit 31 that controls the clock signal of the code RAM 4 receives an input of the clock signal MCLK and also a signal PCSEL_X from the PU 2 that selects the code RAM 4. The clock control unit 32 that controls the clock signal of the data RAM 15 receives an input of the clock signal MCLK and also a signal PDSEL_X from the PU 2 that selects the data RAM 15. The code RAM 4 and the data RAM 15 are divided into two in the word direction, and the clock control units 31 and 32 include clock supply circuits 31a, 31b, 32a, 32b that respectively correspond to the divided parts (hereinafter referred to as "RAM blocks" or "memory blocks") of the RAMs. Accordingly, it is possible to supply a clock signal to and activate only a RAM that has an indicated address. Each of the clock control units 31a to 32b decodes the first bit of an address and supplies a clock signal to only the memory block that is to be activated.

In an integral-type processor like the VUPU 10 where a processor core (PU) 2 and one or some special-purpose circuits such as the VUs 1 are integrated in a single chip, not just the processor core 2 but the RAMs are also provided on the same silicon for converting the integral-type processor into a system LSI. The present method, which activates only the selected RAM or, in cases where the RAM is divided in the word direction due to construction-related reasons for the system LSI, only the RAM block produced by such division, is extremely effective at eliminating the wasteful use of power.

Figure 5:
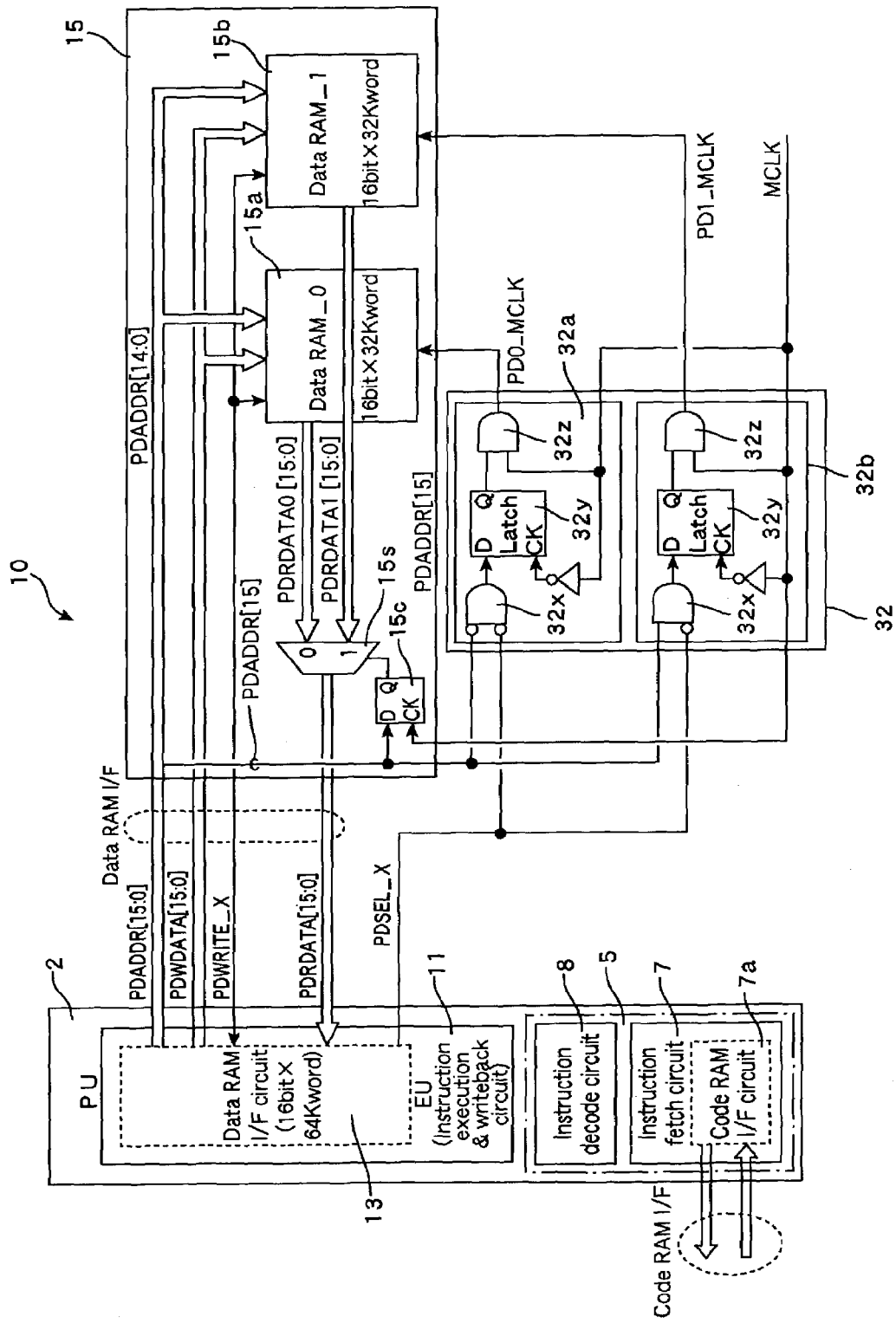
FIG. 5 is a block diagram showing a clock supply circuit for a data RAM.

FIG. 5 shows the detailed construction of the control circuit 32 that supplies a clock signal to the data RAM 15. The control unit 31 that supplies the clock signal to the code RAM 4 also controls a clock signal with exactly the same construction. Control over the data RAM 15 is performed by the data RAM interface circuit 13 of the EU 11. To do so, the data RAM interface circuit 13 is equipped with a function that controls an address bus PDADDR that outputs an address signal, a bus PDWDATA that writes data, and a bus PDRDATA that reads data, as well as a function that outputs a PDWRITE_X signal that controls the RAM 15. In addition, when accessing the data RAM 15, the selection signal PDSEL_X is generated and outputted by the data RAM interface circuit 13.

The data RAM 15 uses 16-bit addresses and a RAM region with a 64K word depth is divided in 32K word units into two RAM blocks 15a and 15b. The first bit PDADDR [15] of the 16-bit address signal PDADDR [15:0] that is outputted to this data RAM 15 can be used as the selection signal for these two RAM blocks 15a and 15b. Accordingly, the PDADDR [15] is used as a selection signal for a selector 15s that selects read data from the two RAM blocks 15a and 15b. At this point, the select signal of the selector 15s that selects the read data of the two RAM blocks 15a and 15b must be synchronized with the output timing of the original RAM read data. For this reason, a signal that has been delayed by one clock by a flip-flop 15c with respect to the RAM address signal PDADDR [15] is supplied to the selector 15s.

The memory clock control unit 32 includes the clock supply circuits 32a and 32b that respectively correspond to the RAM blocks 15a and 15b and supplies the individual clock signals PD0_MCLK and PD1_MCLK to the RAM blocks 15a and 15b. These clock signals correspond to the third clock signal mentioned above, with the memory clock control units 31 and 32 corresponding to a third clock supply means. Each of the clock supply circuit 32a and 32b receive inputs of a memory selection signal PDSEL_X and a first bit PDADDR [15] of the address data. In one clock supply circuit 32a, a NAND is calculated for the memory selection signal PDSEL_X and the PD_ADDR [15] and the output is latched by the latch circuit 32y. When both of the memory selection signal PDSEL_X and the PDADDR [15] are on (at a high level), the MCLK signal is outputted as the PD0_MCLK signal from the gate circuit 32z. Accordingly, when either of the memory selection signal PDSEL_X and the PDADDR [15] are off (at the low level), the clock signal PD0_MCLK is not outputted and the RAM block 15a does not operate. This means that the clock signal PD0_MCLK serves as both a clock signal and a selection signal for the RAM block 15a.

The construction of the other clock supply circuit 32b is the same as that of the clock supply circuit 32a described above, though a signal that is the inverse of PDADDR [15] is inputted into the gate circuit 32x. This means that when the first bit PDADDR [15] of the address data differs from the above case, a PD1_MCLK signal is supplied as both a clock signal and a select signal for the RAM block 15b, and the RAM block 15b is selected.

The construction of clock control unit 31 that supplies a clock signal to the code RAM 4 is almost the same as that described above. Since the code RAM 4 is also divided into two blocks numbered 4a and 4b, clock signals PC0_MCLK and PC1_MCLK are supplied to these RAM blocks 4a and 4b respectively by the corresponding clock supply circuits 31a and 31b. Since the code RAM 4 is controlled by a code RAM interface circuit unit 7a of a fetch control circuit 7, in addition to the memory selection signal PCSEL_X, a first bit PCADDR [15] of the address data PCADDR [15:0] supplied from the interface circuit unit 7a becomes a control signal for the clock supply circuits 31a and 31b, so that when one of the RAM blocks 4a and 4b is selected, the PC0_MCLK signal or the PC1_MCLK signal is outputted from the MCLK signal.

While an example where the RAM is divided into two blocks is described in the present embodiment, it is possible to manage cases where the RAM is divided into three or more blocks by increasing the number of first bits of the address data to be decoded, so that clock supply circuits of the same construction can be used in such cases also.

In this way, with the VUPU 10 of the present embodiment, out of the code RAM 4 and the data RAM 15, a clock signal is generated from the MCLK signal and supplied only when one of these RAMs or RAM blocks is selected so that only the RAM or the RAM block that is being accessed is activated. During a state where the VU 1 is operational and the PU 2 is waiting for such operation to end, the operation of the PU 2 is halted, though as described above, there is the possibility that halting the MCLK signal will cause overheads. In such cases, the MCLK signal is operational, but the PU 2 is halted so that no accesses are performed for the memory units. Accordingly, by activating the memory units only when the PU 2 becomes operational and the data RAM 15 or the code RAM 4 has been selected for access by a read or write, the power consumed by the memory units can be reduced.

In addition, in the present embodiment when each of the RAM regions is composed of a plurality of blocks produced by division in the word direction, it is possible to activate only the RAM block with the address for which access has been requested. The RAMs 4 and 15 do not need to operate continuously and the power consumed by the RAMs 4 and 15 can be reduced.

Figure 6:
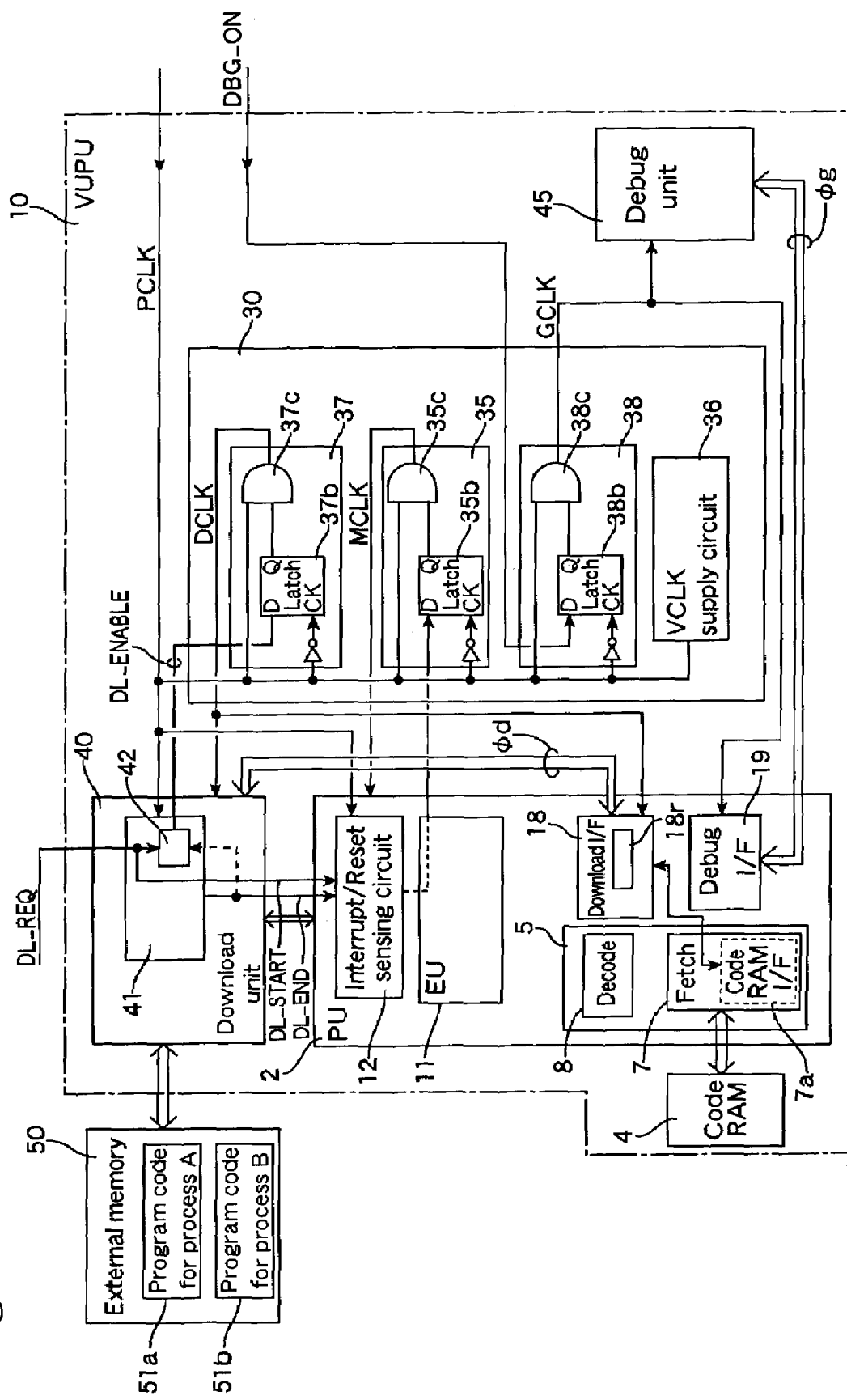
FIG. 6 is a block diagram showing supply circuits for a DCLK signal and a GCLK signal.

FIG. 6 shows a DCLK supply circuit 37 that supplies a DCLK signal that is corresponding to the fourth clock signal to the download control unit 40 and a GCLK supply circuit 38 that supplies a GCLK signal that is corresponding to the fifth clock signal to the debug unit 45. The VUPU 10 has a download function for downloading instruction code and data from an external non-volatile memory 50, for example, into the code RAM 4 and the data RAM 15 that are provided onchip. Normally, after at least the code RAM 4 has been reset, such as when the power is turned on, downloading is definitely executed, the program code 3 is loaded into the RAM 4, and initialization is performed. Once the RAM 4 has been initialized by the download and the VUPU 10 has started the normal instruction operation processing, the download control unit 40 and the download circuit 18 that are provided for realizing the downloading function no longer need to operate. Accordingly, by having the DCLK supply circuit 37 that supplies these circuits with the DCLK signal that is separate to the other clocks (PCLK, MCLK, VCLK, etc.) and can be halted, it is possible to reduce the power consumed by a system LSI with VUPU during normal operation.

In this example, a program 51a for the processes A and a program 51b for the processes B both processed by the VUPU 10 are recorded in the external memory 50. Without performing initialization via a system reset, downloading is performed dynamically into the code RAM 4 whose size is limited, with the VUPU 10 switching execution between process A and process B. To do so, the download control unit 40 successively writes the program code for each process that is stored in the external memory 50 into a download dedicated register 18r of the download circuit 18 in the PU 2, with this program code being written into the code RAM 4 via the code RAM interface circuit unit 7a of the fetch subunit 7. The functions of the download circuit 18 further include a function (a verify function) that automatically reads out the data that has been written and compares the data with expected values.

The download control unit 40 includes a download state managing circuit 41 that detects a signal DL_REQ that indicates a download from the outside of the VUPU 10. In the download state managing circuit 41, a flip-flop 42 is set by the signal DL_REQ, and an enable signal DL_ENABLE for operating the clock signal DCLK supplied to the download control unit 40 and the download circuit 18 is asserted. In order to always be able to receive the download start request signal DL_REQ, the clock signal PCLK that is always operational is supplied to the download state managing circuit 41 inside the download control unit 40.

The clock control unit 30 includes a DCLK supply circuit 37 that has the enable signal DL_ENABLE and the PCLK signal as input signals. The enable signal DL_ENABLE is latched by the latch circuit 37b, the output of this latch circuit 37b opens the AND gate circuit 37c, and the PCLK signal is outputted as the DCLK signal. The DCLK signal is supplied to the download control unit 40 and the download circuit 18 of the PU 2. Accordingly, the other functions except the download state managing circuit 41 of the download control unit 40 and the download circuit 18 become operational by the DCLK, and downloading is executed from the external memory 50 to the internal memory 4.

The DL_REQ signal inputted into the download control unit 40 is also supplied to the PU 2 as an interrupt signal DL_START that requests a start of the execution of download processing. The PU 2 therefore receives an interrupt and even if the PU 2 was in the halt state, the MCLK signal is returned to the operational state. By the PU 2, the download processing is specified, and information such as the read start address for the external memory, the number of words in the downloaded code, the download destination start address of the PU code RAM is written in a register of the download control unit 40 using an I/O instruction from the PU. The processing that relates to downloads is described in more detail with reference to FIG. 8.

The VUPU 10 also includes the debug unit 45. By incorporating the debug unit 45, using the debug unit interface unit 19 of the PU 2 and a debug unit interface signal _g, information on the PU 2 and the VU 1 can be set in the debug unit 45 and the information can be monitored if required. By the debug unit 45, it is possible to debug the program processing executed by the VUPU 10. In addition, in order to improve the efficiency of the debugging, debugging monitoring software may be provided in a personal computer that is external to the system LSI, and by communicating with the debug unit 45, debugging may be performed on the external computer.

Normally, the debugging process needs to be performed during the system development stage or when a system failure has occurred, though when the system is operating as normal, such processes and circuits are not required. However, circuits for the debugging processing still have to be provided in the system LSI. In view of the power consumption, it is effective to separate off a dedicated clock GCLK in advance so that this clock can be made operational only when necessary and can be halted when debugging is not required. When debugging the VUPU 10 in the system LSI, a switching signal from other hardware or an indication from a higher level CPU is required for entering a debug mode. Therefore, the signal DBG_ON is supplied from the outside to the VUPU 10 for this purpose.

The clock control unit 30 includes a GCLK supply circuit 38 that has the debug signal DBG_ON and the PCLK signal as input signals. The debug signal DBG_ON is latched by a latch circuit 38b, the output of this latch circuit 38b opens the AND gate 38c, and the PCLK signal is outputted as the GCLK signal. The GCLK signal is supplied to the debug interface circuit 19 of the PU 2 and the debug unit 45. Accordingly, the debug unit 45 and the debug interface circuit 19 become operational, and the VUPU 10 operates in debugging mode.

In the system (VUPU) that has been activated in the debugging mode, conditions for execution breaks and the like are set, via external monitor interface signals, in the various registers in the debug unit 45 by debugging monitoring software that normally runs on an external computer. After the sets, a program is executed by the VUPU 10. The debug unit 45 can monitor the execution address and data information of the PU 2 using the debug unit interface signal _g from the debug unit interface unit 19 of the PU 2. When the set break conditions are satisfied, the debug unit 45 handshakes for transiting into debugging mode in that the program processing in the PU 2 stop. In addition, the debug unit 45 can obtain information on the registers, the data RAM, flags, etc. of the PU and VU that have been stopped, and forcibly provide the PU with instructions from outside and have the PU execute such instructions.

During normal processing, the circuitry for performing this series of debugging processes does not need to perform any operations whatsoever, so that by supplying a dedicated clock GCLK that is separate to the other clocks (PCLK, MCLK, VCLK, DCLK) to only the debug unit 45 and the debug unit interface unit 19 and having the system operate according to the DBG_ON signal that shows the system LSI is operating in debugging mode, the power consumption of the system LSI can be reduced even if the debug unit 45 is implemented for debugging in the system LSI.

Figure 7:
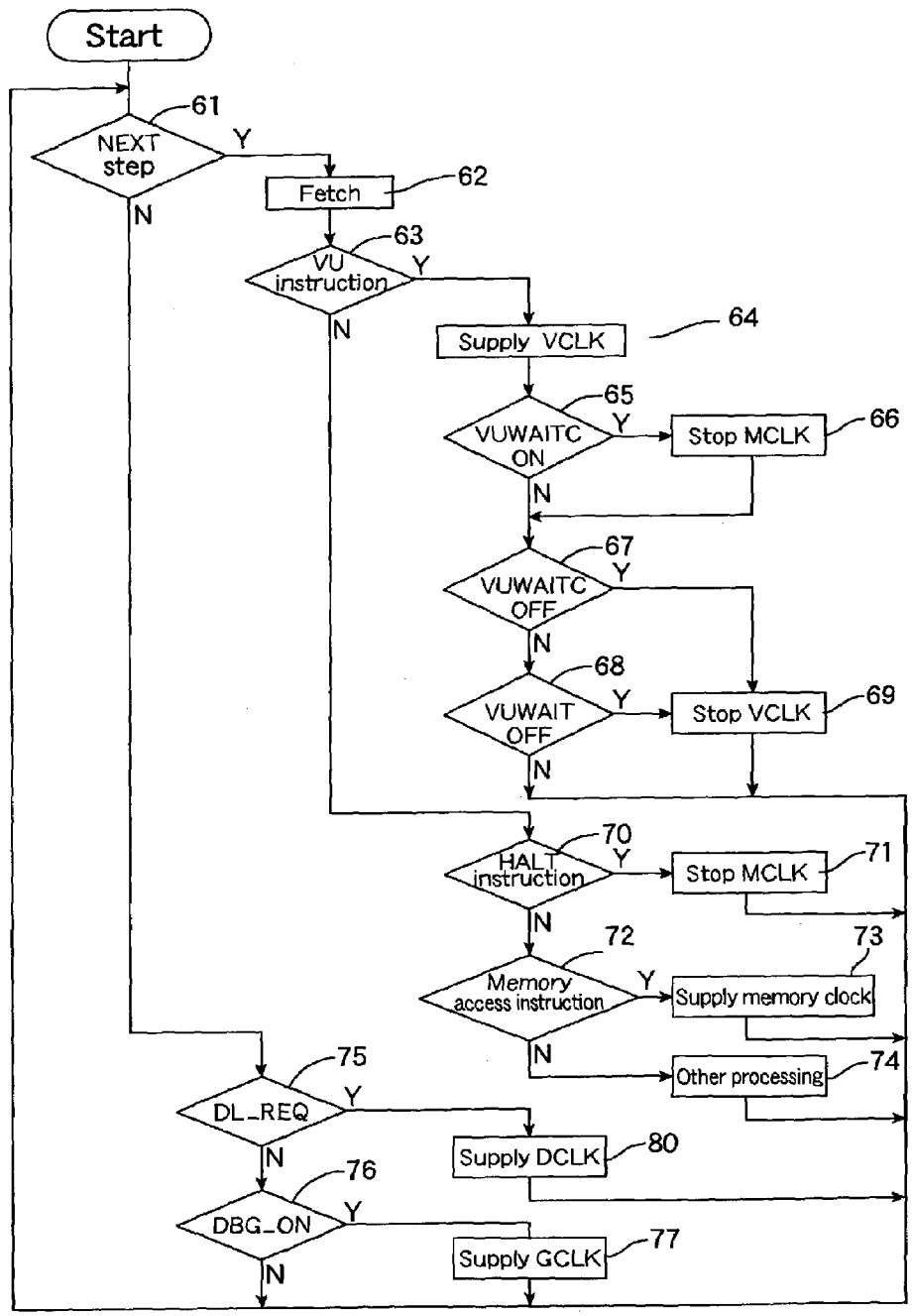
FIG. 7 is a flowchart showing an overview of clock control in the VUPU.

FIG. 7 shows the series of processes related to clock control in the VUPU 10 by way of a flowchart. When, in step 61, the next or followed process has been selected in order to have the VUPU 10 operate as normal, in step 62 the FU 5 fetches the next instruction. When, in step 63, the fetched instruction is a VU instruction, in step 64 the VCLK signal is supplied to the VU 1 by the VCLK supply circuit 36 and the VU 1 is activated. When, in step 65, the VUWAITC signal is sent back from the VU1 in response to a WAITV signal from the PU 2, the VUWAIT state managing circuit unit 11c of the PU 2 identifies the VUWAITC signal, and in step 66 supplies the CLKSTP signal to the MCLK supply circuit 35 so as to stop the MCLK signal. In this way, the PU 2 enters the halt state. If the VUWAITC signal becomes off in step 67 or the VUWAIT signal becomes off in step 68, in step 69 the supplying of the VCLK signal from the VCLK supply circuit 36 is stopped and the VU 1 enters the halt state.

On the other hand, when in step 63 the fetched instruction is a PU instruction, in step 70 the HALT state managing circuit 11a of the PU 2 judges whether the instruction is a HALT instruction. If the instruction is a HALT instruction, in step 71 the supply of the MCLK signal is halted by the MCLK supply circuit 35 and the PU 2 enters the halt state. Supplying MCLK is recommenced by an interrupt signal. When it is judged in step 72 that the PU instruction involves a memory access, in step 73 the memory clock control unit 31 or 32 operates and the MCLK signal is supplied to the memory block to be accessed, thereby activating this memory block. When another kind of PU instruction has been fetched, in step 74 the EU 11 performs processing based on this instruction.

Aside from normal operation, when the signal DL_REQ that indicates downloading has been detected in step 75, in step 80 the DCLK signal is outputted by the DCLK supply circuit 37. In the same way, when the signal DBG_ON that indicates debug mode has been detected in step 76, in step 77 the GCLK signal is outputted by the GCLK supply circuit.

Figure 8:
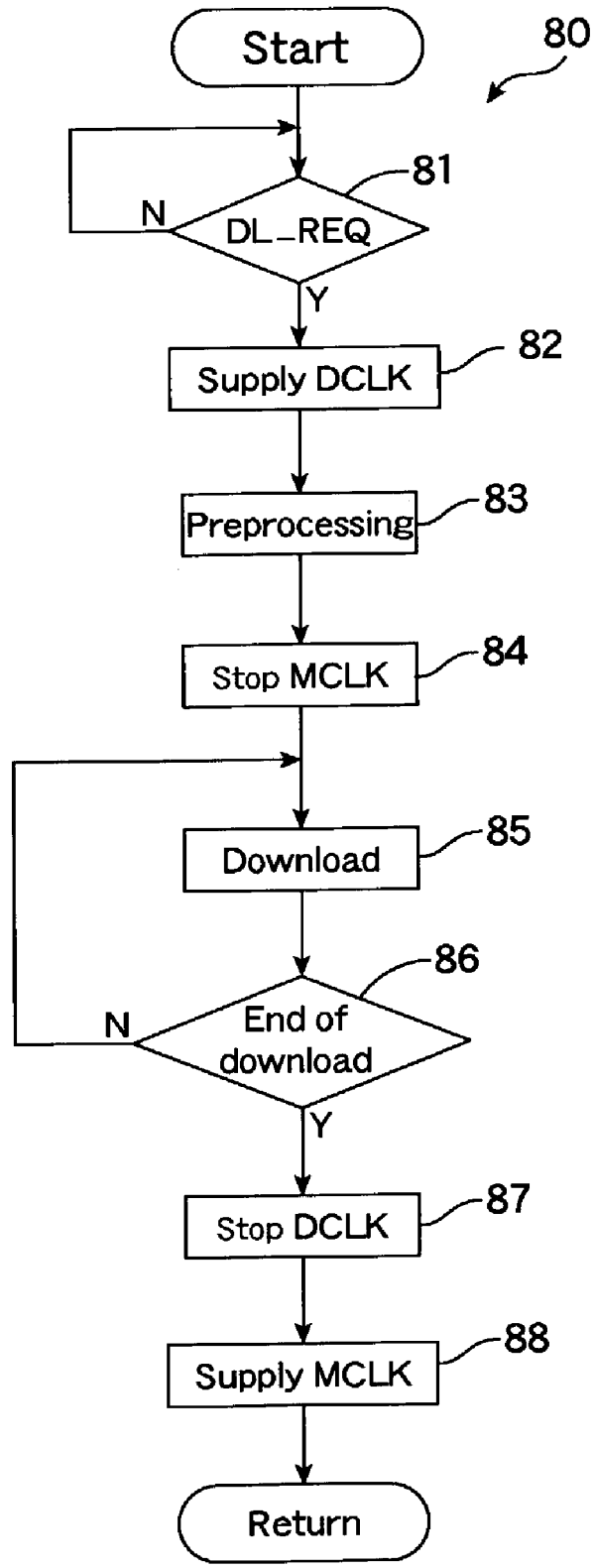
FIG. 8 is a flowchart showing an overview of clock control related to download processing.

In FIG. 8, the download processing is shown in more detail. When a signal DL_REQ, which requests a start to the download processing, from hardware in an external system is detected in step 81, in step 82 the enable signal DL_ENABLE is outputted from the download state managing circuit 41 to the DCLK supply circuit 37, and the DCLK signal is outputted. In this way, the download control unit 40 and the download circuit 18 become active, and the download processing is commenced.

The DL_REQ signal inputted into the download control unit 40 is inputted into the PU 2 as an interrupt in the form of a DL_START signal that requests a start of execution of the download processing. In step 83, the MCLK signal is turned on, and the PU 2 is restored from the HALT state. The PU 2 performs the preprocessing for the download. In this preprocessing, the PU 2 judges from the indicated interrupt process that the download processing has started, reads information from the status register that shows the system status (download request status) of the download state managing circuit 41 using the I/O interface of the PU 2, and judges which download process should be performed. When the download process that should be performed has been specified, PU 2 writes information such as the read start address in an external memory for the download, the number of words in the downloaded code, a download destination start address for the PU code RAM, etc. from the processing program that is to be downloaded into the registers of the download control unit 40 using an I/O instruction. In addition, the PU 2 writes an I/O instruction into a register showing the start of downloading in the download control unit 40 for indicating the start of downloading.

Downloading is started by the above operation, so that in step 84, a HALT instruction is supplied to the PU2 and the PU 2 enters the halt state. However, since the download circuit 18 of the PU 2 is supplied with the DCLK, the download circuit 18 remains operational, and the download processing continues in step 85.

In the download processing, first, the download destination start address in the code RAM 4 set by the PU 2 is written in the download dedicated register 18r of the download circuit 18 in the PU 2 by the state machine of the download control unit 40. Next, by using the external memory read start address set in the same way by the PU 2, data is written via an external memory interface signal from the external memory 50. The data read out to the download control unit 40 is written into the download dedicated register 18r of the download circuit 18 inside the PU 2 using a download interface signal _d. When data has been written into the stipulated 3-word (48-bit) dedicated register in the download circuit 18 of the PU 2, the data is automatically written into the code RAM 4. Accordingly, in the download control unit 40, a sequence where data is read from the external memory 50 and then written into the download circuit 18 is repeated for the number of words to be downloaded that has been set by the PU 2, thereby completing the download processing. In a system where there is a processor, which is to say, a CPU, on a higher level to the VUPU 10, the processing sequence of the download control unit 40 may be executed by the CPU. In such case, the download control unit 40 may be unnecessary or an extremely small circuit block becomes able to serve as the download control unit 40.

While the download processing is being executed, the PU 2 enters the halt state and the MCLK signal is stopped, thereby minimizing the power consumption. When the download processing is completed in step 86, inside the download control unit 40 the flip-flop 42 of the download state managing circuit 41 is reset by a signal DL_END that shows the end of the download. In step 87, the DL_ENABLE signal is deasserted, thereby stopping the operation of the clock DCLK that is supplied to the download circuits. At the same time, in step 88 the DL_END signal is inputted into the interrupt/reset detecting circuit 12 in the PU 2, thereby informing the PU 2 of the completion of the download. In this way, the PU 2 changes from the halt state to the normal state, it is confirmed in the download state managing circuit 41 that the download has ended normally, and processing then commences according to the program 51b for the process B that has been downloaded into the code RAM 4.

As described above, with embodiments of the present invention, a data processing system (VUPU) includes a special-purpose processing unit (VU) and a general-purpose processing unit (PU), and a clock signal PCLK that is supplied to the interrupt/reset circuit in the PU 2, the clock signal MCLK supplied to the PU 2, the clock signal VCLK supplied to the VU 1, the clock signal DCLK supplied to the download processing system, and the clock signal GCLK supplied to the debugging processing system are all separated, so that each clock signal can be stopped when it is not required. Accordingly, the wasteful consumption of power during the normal operation of a system LSI equipped with a VUPU can be prevented.

With a VUPU, processing where there is frequently repeated calculation or the like are extracted in units of function and that functions are realized by VUs, which accelerates the processing, with the remaining processing being performed by the PU which is a general-purpose processor. Accordingly, increases in cost due to the conversion to hardware and increases in the time required for design can be suppressed, with there being a further merit in that changes in specification and changes in the different development stages can be managed flexibly. One advantage of the present invention is that by the operation of the VUPU, it is possible to stop the operation of a memory unit. This is to say, the processing of the VUPU does not simply advance the program counter and it is not necessary for the program counter to advance during processing by the VU. Accordingly, the ability to stop the operation of memory units in the form of a code RAM and a data RAM during such processing makes it possible to greatly reduce the power consumption of the memory units without significantly affecting the performance, such as the execution speed, of the VUPU.

Also, since there are many cases where the processing proceeds by the VU and/or the PU independently, stopping the supply of the clock signal to the VU or PU according to the present invention is extremely effective in reducing power consumption. When the clock signals are controlled in this way, effect on the execution speed of the VUPU is negligible. By stopping the MCLK signal of the PU based on the wait signal of the VU or VUs, which are hardware for executing functions being suitable into hardware for execution, can be equipped with clock control over the PU. This makes it extremely easy to halt the PU with appropriate timing for only the appropriate periods, so that power consumption can be reduced without lowering the performance of the VUPU. Accordingly, the VUPU of the present invention providing hardware and a design method those offer both great flexibility for design and a high execution speed also provides hardware and design method those suit to reducing power consumption.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A data processing system, comprising:
    a general-purpose data processing unit including an instruction issuing unit that fetches and decodes an instruction in a program and issues the instruction or control signals, and an execution unit that executes general-purpose processing according to a general-purpose instruction in the program or control signals produced by decoding the general-purpose instruction;
    a special-purpose data processing unit, including a data path unit for special-purpose data processing, that executes special-purpose data processing according to a special-purpose instruction in the program or control signals produced by decoding the special-purpose instruction;
    first clock supply means for stopping, based on a wait signal that is issued by the special-purpose data processing unit and shows that the general-purpose data processing unit is waiting for processing of the special-purpose data processing unit, a first clock signal for a part of the general-purpose data processing unit excluding an interrupt/reset function unit that detects an interrupt signal and a reset signal; and
    a second clock supply means for supplying a second clock signal to the special-purpose data processing unit for operating the special-purpose data processing unit;
    wherein the general-purpose data processing unit further includes a second clock managing function unit which, when a special-purpose instruction for the special-purpose data processing unit or control signals decoded from a special-purpose instruction have been supplied, allows the second clock supply means to supply the second clock signal.

2. A data processing system according to claim 1, wherein the general-purpose data processing unit includes a first clock managing function unit which, according to a general-purpose instruction, allows the first clock supply means to stop the first clock signal, with the wait signal from the special-purpose data processing unit being supplied to the first clock managing function unit.

3. A data processing system according to claim 2, wherein the wait signal supplied to the first clock managing function unit from the special-purpose data processing unit includes a first wait signal that allows the first clock signal to be stopped and a second wait signal that does not allow the first clock signal to be stopped.

4. A data processing system according to claim 1, wherein the wait signal is also supplied to the second clock managing function unit and based on the wait signal, the second clock managing function unit allows the second clock supply means to stop the second clock signal.

5. A data processing system comprising:
    general-purpose data processing unit including an instruction issuing unit that fetches and decodes an instruction in a program and issues the instruction or control signals, and an execution unit that executes general-purpose processing according to a general-purpose instruction in the program or control signals produced by decoding the general-purpose instruction;

a special-purpose data processing unit, including a data path unit for special-purpose data processing, that executes special-purpose data processing according to a special-purpose instruction in the program or control signals produced by decoding the special-purpose instruction;

first clock supply means for stopping, based on a wait signal that is issued by the special-purpose data processing unit and shows that the general-purpose data processing unit is waiting for processing of the special-purpose data processing unit, a first clock signal for a part of the general-purpose data processing unit excluding an interrupt/reset function unit that detects an interrupt signal and a reset signal;

a memory for storing the program and/or data to be processed by the general-purpose data processing unit; and a third clock supply means for supplying, according to a memory selection signal that shows that the general-purpose data processing unit is accessing the memory unit, a third clock signal that has the memory unit operate.

6. A data processing system according to claim 5, wherein the memory unit includes a plurality of memory blocks and the third clock supply means supplies the third clock signal to a memory block that is selected by an address outputted by the general-purpose data processing unit.

7. A data processing system comprising:

a general-purpose data processing unit including an instruction issuing unit that fetches and decodes an instruction in a program and issues the instruction or control signal, and an execution units that executes general-purpose processing according to a general-purpose instruction in the program or control signals produced by decoding the general-purpose instruction;

a special-purpose data processing unit, including a data path unit for special-purpose data processing, that executes special-purpose data processing according to a special-purpose instruction in the program or control signals produced by decoding the special-purpose instruction;

first clock supply means for stopping, based on a wait signal that is issued by the special-purpose data processing unit and shows that the general-purpose data processing unit is waiting for processing of the special-purpose data processing unit, a first clock signal for a part of the general-purpose data processing unit excluding an interrupt/reset function unit that detects an interrupt signal and a reset signal;

a memory unit for storing the program;

a download control unit for controlling a download from an external memory into the memory unit; and fourth clock supply means for supplying, according to a download start signal from outside, a fourth clock signal that has the download control unit operate.

8. A data processing system according to claim 7, wherein the general-purpose data processing unit includes a download function unit that operates only when the download control unit is operating, and the fourth clock signal is supplied to the download function unit.

9. A data processing system comprising:

a general-purpose data processing unit including an instruction issuing unit that fetches and decodes an instruction in a program and issues the instruction or control signals, and an execution unit that executes general-purpose processing according to a general-purpose instruction in the program or control signals produced by decoding the general-purpose instruction;

a special-purpose data processing unit, including a data path unit for special-purpose data processing, that executes special-purpose data processing according to a special-purpose instruction the program or control signals produced by decoding the special-purpose instruction;

first clock supply means for stopping, based on a wait signal that is issued by the special-purpose data processing unit and shows that the general-purpose data processing unit is waiting for processing of the special-purpose data processing unit, a first clock signal for a part of the general-purpose data processing unit excluding an interrupt/reset function unit that detects an interrupt signal and a reset signal;

a debug unit that is capable of monitoring data that is being processed by the general-purpose data processing unit and/or the special-purpose data processing unit; and a fifth clock supply means for supplying, according to a debug signal from the outside, a fifth clock signal that has the debug unit operate.

10. A data processing system according to claim 9, wherein the general-purpose data processing unit includes a debugging function unit that operates only when the debug unit is operating, and the fifth clock signal is supplied to the debugging function unit.

11. A control method for a data processing system, comprising:

a step of fetching and decoding an instruction in a program and supplying, when the instruction in the program is a general-purpose instruction, the general-purpose instruction or control signals produced by decoding the general-purpose instruction to an execution unit of general-purpose data processing unit;

a step of supplying, when the instruction in the program is a special-purpose instruction, the special-purpose instruction or control signals produced by decoding the special-purpose instruction to a special-purpose data processing unit including a data path unit for special-purpose data processing;

a step of stopping, based on a wait signal that is issued by the special-purpose data processing unit and shows that the general-purpose data processing unit is waiting for processing of the special-purpose data processing unit, a first clock signal for a part of the general-purpose data processing unit excluding an interrupt/reset function unit that detects an interrupt signal and a reset signal; and a step of supplying, when a special-purpose instruction for the special-purpose data processing unit or control signals decoded from a special-purpose instruction have been supplied, a second clock signal for operating the special-purpose data processing unit.

12. A control method according to claim 11, wherein the wait signal includes a first wait signal that allows the first clock signal to be stopped and a second wait signal that does not allow the first clock signal to be stopped.

13. A control method according to claim 11, wherein a stopping of the second clock signal is allowed based on the wait signal.

14. A control method for a data processing system, comprising:
- a step of fetching and decoding an instruction in a program and supplying, when the instruction in the program is a general-purpose instruction, the general-purpose instruction or control signals produced by decoding the general-purpose instruction to an execution unit of general-purpose data processing unit;
- a step of supplying, when the instruction in the program is a special-purpose instruction, the special-purpose instruction or control signals produced by decoding the special-purpose instruction to a special-purpose data processing unit including a data path unit of special-purpose data processing;
- a step of stopping, based on a wait signal that is issued by the special-purpose data processing unit and shows that the general-purpose data processing unit is waiting for processing of the special-purpose data processing unit, a first clock signal for a part of the general-purpose data processing unit excluding an interrupt/reset function unit that detects an interrupt signal and a reset signal; and
- a memory clock control step of supplying, according to a memory selection signal that shows the general-purpose data processing unit is accessing a memory unit which stores the program and/or data to be processed by the general-purpose data processing unit, a third clock signal for having the memory unit operate.

15. A control method according to claim 14, wherein the memory unit includes a plurality of memory blocks and in the memory clock control step the third clock signal is supplied to a memory block selected by an address outputted by the general-purpose data processing unit.

16. A control method for a data processing system, comprising:
- a step of fetching and decoding an instruction in a program and supplying, when the instruction in the program is a general-purpose instruction, the general-purpose instruction or control signals produced by decoding the general-purpose instruction to an execution unit of general-purpose data processing unit;
- a step of supplying, when the instruction in the program is a special-purpose instruction, the special-purpose instruction or control signals produced by decoding the special-purpose instruction to a special-purpose data processing unit including a data path unit of special-purpose data processing;
- a step of stopping, based on a wait signal that is issued by the special-purpose data processing unit and shows that the general-purpose data processing unit is waiting for processing of the special-purpose data processing unit, a first clock signal for a part of the general-purpose data processing unit excluding an interrupt/reset function unit that detects an interrupt signal and a reset signal; and
- a step of supplying, according to a download start signal from outside, a fourth clock signal for having a download control unit, which controls a download from an external memory into a memory unit that stores the program, operate.

17. A control method for a data processing system, comprising:
- a step of fetching and decoding an instruction in a program and supplying, when the instruction in the program is a general-purpose instruction, the general-purpose instruction or control signals produced by decoding the general-purpose instruction to an execution unit of general-purpose data processing unit;
- a step of supplying, when the instruction in the program is a special-purpose instruction, the special-purpose instruction or control signals produced by decoding the special-purpose instruction to a special-purpose data processing unit including a data path unit of special-purpose data processing;
- a step of stopping, based on a wait signal that is issued by the special-purpose data processing unit and shows that the general-purpose data processing unit is waiting for processing of the special-purpose data processing unit, a first clock signal for a part of the general-purpose data processing unit excluding an interrupt/reset function unit that detects an interrupt signal and a reset signal; and
- a step of supplying, according to a debug signal from outside, a fifth clock signal for having a debug unit, which is capable of monitoring data that is being processed by the general-purpose data processing unit and/or the special-purpose data processing unit, operate.

* * * * *